(12) United States Patent
Kim (10) Patent No.: US 10,781,783 B1
(45) Date of Patent: Sep. 22, 2020

(54) APPARATUS AND METHOD FOR CONTROLLING VEHICLE ENGINE STARTING

(71) Applicants: Hyundai Motor Company, Seoul (KR); Kia Motors Corporation, Seoul (KR)

(72) Inventor: Seungbum Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/600,734

(22) Filed: Oct. 14, 2019

(30) Foreign Application Priority Data

May 8, 2019 (KR) .................. 10-2019-0053604

(51) Int. Cl.
*F02N 11/08* (2006.01)
*F16H 61/688* (2006.01)
*F16H 61/28* (2006.01)

(52) U.S. Cl.
CPC ...... *F02N 11/0851* (2013.01); *F02N 11/0807* (2013.01); *F16H 61/688* (2013.01); *F16H 2061/2823* (2013.01)

(58) Field of Classification Search
CPC ............. F02N 11/0851; F02N 11/0807; F16H 61/688; F16H 2061/2823
USPC ........ 123/179.25, 179.28; 701/112, 113, 107
See application file for complete search history.

(56) References Cited

U.S. PATENT DOCUMENTS 10,589,733 B2 * 3/2020 Kim ...................... B60W 20/00

* cited by examiner

*Primary Examiner* — Hai H Huynh
(74) *Attorney, Agent, or Firm* — Morgan, Lewis & Bockius LLP (57) ABSTRACT

An apparatus of controlling starting of an engine may include a starter, an electronic clutch mounted between the engine and a transmission, a gear position detector, a clutch controller configured to control the electronic clutch, receive the gear stage position data from the gear position detector, and generate a gear stage status data, and a vehicle controller connected to the clutch controller through a vehicle communication network, and configured to receive start signal, determine whether the vehicle communication network and the clutch controller are normal, receive the gear position data from the gear position detector and the gear stage status data from the clutch controller when the vehicle communication network and the clutch controller are determined to be normal, and operate the starter to start the engine based on the gear stage status data and the gear position data.

12 Claims, 4 Drawing Sheets

APPARATUS AND METHOD FOR CONTROLLING VEHICLE ENGINE STARTING

CROSS-REFERENCE TO RELATED APPLICATION

The present application claims priority to Korean Patent Application No. 10-2019-0053604 filed on May 8, 2019, the entire contents of which is incorporated herein for all purposes by this reference.

BACKGROUND OF THE INVENTION

Field of the Invention

The present invention is related to an apparatus and a method for controlling starting of vehicle engine, more particularly, related to an apparatus and a method for controlling starting of vehicle engine capable of starting the engine, when driver's request is input, with electronic clutch mounted between the engine and a transmission.

Description of Related Art

A power transmission apparatus of a vehicle is an apparatus of transmitting power generated by an engine to a driving wheel. Such a power transmission apparatus may be classified into a manual transmission and an automatic transmission.

A manual transmission represents a transmission which is been controlled by driver through a shift lever to change transmission stages according to vehicle speed and rotation rate of the engine. On the other hand, an automatic transmission represents a transmission that automatically changes transmission stages according to vehicle speed, opening rate of throttle valve, etc.

Recently, Worldwide Harmonized Light Vehicle Test Procedure (WLTP) and Real Driving Emission (RDE) are being implemented as a regulation on the exhaust gas test of diesel engine vehicles, replacing conventional regulations such as New European Driving Cycle (NEDC). Accordingly, in Europe, the WLTP and the RDE have been implemented from Sep. 1, 2017, and in Korea, they have been implemented from Sep. 1, 2018.

Accordingly, vehicle manufacturers are working on a variety of research and development to reduce $CO_2$ emissions and improve fuel efficiency in manual transmission vehicles.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for controlling engine starting capable for controlling engine starting when the driver requests starting by disposing electronic clutch between the engine and the transmission.

Furthermore, various aspects of the present invention are directed to providing an apparatus and a method for controlling engine starting capable for controlling engine starting by operate a starter based on gear stage data and gear position data of clutch controller configured for controlling the electronic clutch.

An apparatus of controlling starting of an engine according to an exemplary embodiment of the present invention may include a starter configured to start an engine, an electronic clutch mounted between the engine and a transmission, a gear position detector configured to detect a position of gear stage of the transmission and generate a gear stage position data, a clutch controller configured to control the electronic clutch to be coupled or released, receive the gear stage position data from the gear position detector, and generate a gear stage status data, and a vehicle controller connected to the clutch controller through a vehicle communication network, and configured to receive start signal, determine whether the vehicle communication network and the clutch controller are normal, receive the gear position data from the gear position detector and the gear stage status data from the clutch controller when the vehicle communication network and the clutch controller are determined to be normal, and operate the starter to start the engine based on the gear stage status data and the gear position data.

The vehicle controller may be configured to receive the gear position data from the gear position detector in a pin-to-pin manner.

The vehicle controller may be configured to operate the starter to start the engine when the vehicle communication network and the clutch controller are normal, the gear stage status data includes a state of N stage, and the gear position data includes a state of N stage.

The vehicle controller may be configured to determine a status determination on the clutch controller to be abnormal when the vehicle communication network and the clutch controller are normal, the gear stage status data does not include a state of N stage, the gear position data includes a state of N stage, and operate the starter to start the engine when a clutch status data of the electronic clutch includes a state in which the electronic clutch is released.

The vehicle controller may be configured to determine a status determination on the clutch controller to be abnormal when the vehicle communication network and the clutch controller are normal, the gear stage status data includes a state of N stage, the gear position data does not include a state of N stage, and operate the starter to start the engine when a clutch status data of the electronic clutch includes a state in which the electronic clutch is released.

The vehicle controller may be configured to generate an alert notice data when the vehicle communication network and the clutch controller are normal and the gear stage status data and the gear position data do not include the state of N stage, and output the alert notice data through an output unit.

The vehicle controller may be configured to operate the starter to start the engine when the vehicle communication network or the clutch controller is abnormal and the gear position data includes a state of N stage.

Furthermore, a method for controlling starting of an engine of a vehicle including a starter configured to start an engine, an electronic clutch mounted between the engine and a transmission, a gear position detector configured to generate a gear position data by detecting a position of gear stage of the transmission, and a clutch controller configured to control the electronic clutch to be coupled or released, receive the gear stage position data from the gear position detector, and generate a gear stage status data according to an exemplary embodiment of the present invention may include, when a start signal is input to the vehicle, determining, by the vehicle controller, whether a vehicle communication network and the clutch controller are normal or abnormal, when the vehicle communication network and the clutch controller are normal, determining, by the vehicle controller, whether the gear stage status data received from the clutch controller is a state of N stage, when the gear stage data includes a state of N stage, determining, by the vehicle controller, whether the gear position data received from the gear position detector includes the state of N stage, and when the gear position data includes a state of N stage, operating, by the vehicle controller, to start the engine.

According to an exemplary embodiment of the present invention, since the starter is driven while the electronic clutch is released, it is possible to prevent the starter from being damaged or burned out.

Furthermore, even if the gear stage data is not provided due to a failure of the clutch controller for controlling the electronic clutch, the engine may be started based on the gear position data provided from the gear position detector, improving startability of the engine.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an apparatus and a method for controlling starting of a mild hybrid vehicle according to an exemplary embodiment of the present invention is described in detail with reference to the drawings. However, the drawings to be described below and the following detailed description relate to one exemplary embodiment of various exemplary embodiments for effectively explaining the characteristics of the present invention. Therefore, the present invention may not be construed as being limited to the drawings and the following description.

Furthermore, in the description of exemplary embodiments of the present invention, the detailed description of related well-known configurations and functions is not provided when it is determined as unnecessarily making the scope of the present invention unclear. Furthermore, the terminologies to be described below are ones defined in consideration of their function in an exemplary embodiment of the present invention and may be changed by the intention of a user, an operator, or a custom. Therefore, their definition may be made on the basis of the description of the present invention.

Furthermore, in the following exemplary embodiments of the present invention, the terminologies are appropriately changed, combined, or divided so that those skilled in the art can clearly understand them, to efficiently explain the main technical characteristics of the present invention, but the present invention is not limited thereto.

Hereinafter, various exemplary embodiments of the present invention will be described in detail with reference to the accompanying drawings.

Figure 1:
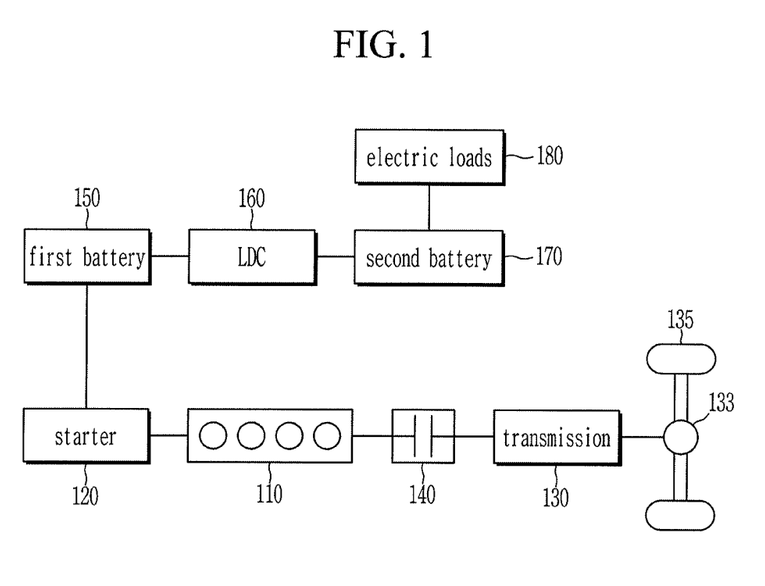
FIG. 1 is a block diagram illustrating a vehicle according to an exemplary embodiment of the present invention.

FIG. 1 is a block diagram illustrating a vehicle according to an exemplary embodiment of the present invention.

Referring to FIG. 1, a vehicle includes an engine 110, a starter 120, a transmission 130, a differential gear device 133, a driving wheel 135, an electronic clutch 140, a first battery 150, a Low voltage DC-DC Converter (LDC) 160, a second battery 170 and an electronic device load 180.

The engine 110 generates a drive torque by combustion of a fuel. That is, the engine 110 transforms a chemical energy of the fuel to a mechanical energy, by combustion of the fuel with the air. The engine 110 may generate combustion torque by controlling the ignition timing, the air amount, the fuel amount, the air-fuel ratio, and the like.

In the power transmission of the vehicle, the torque of the engine 110 is transmitted to the input shaft of the transmission 130, and the torque output from the output shaft of the transmission 130 is transmitted to the axle via the differential gear device 133. As the axle rotates the driving wheel 135, the vehicle is driven by the torque generated by the engine 110.

The starter 120 starts the engine 110. The starter 120 may be directly connected to the crankshaft of the engine 110 to start the engine 110.

The transmission 130 delivers the output torque to the driving wheel 135 to drive the vehicle. The transmission 130 may be a manual transmission (MT).

The transmission 130 is shifted by a driver's manipulation of stepping on the clutch pedal and moving a gear lever to a desired gear stage. The transmission 130 converts the output torque of the engine 110 into a corresponding transmission ratio according to the operation of the gear lever of the driver and outputs the driving torque to the differential gear device 133.

An electronic clutch 140 is mounted between the engine 110 and the transmission 130. Electronic clutch 140 is coupled or released to transmit or block the torque of the engine 110 to the drive wheel 135.

A first battery 150 supplies electric power to the starter 120. The first battery 150 may be a high voltage battery (e.g., 48V battery), and may be expressed as a "main battery".

For example, the first battery 150 may be a lithium-ion battery. Such a lithium-ion battery has fast charge and discharge speed and good durability, but may have low energy storage performance and charge/discharge efficiency at an extremely low temperature.

The LDC 160 charges the second battery 170 by converting a voltage supplied from the first battery 150 (e.g., 48 V) to a low voltage (e.g., 12 V).

The second battery 170 may be charged through power supplied from the LDC 160. The second battery 170 is a low voltage battery (e.g., a 12 V battery) and may be referred to as an auxiliary battery.

For example, the second battery 170 may be an absolute glass mat (AGM) battery or a lead-acid battery.

The second battery 170 supplies power to the electrical load 180 using a low voltage (e.g., 12 V).

The electric load 180 indicates a component driven by the second battery 170 in the vehicle. For example, the electric load 180 may include an air conditioner, a headlamp, a wiper, a fog lamp, a sunroof, and the like.

Figure 2:
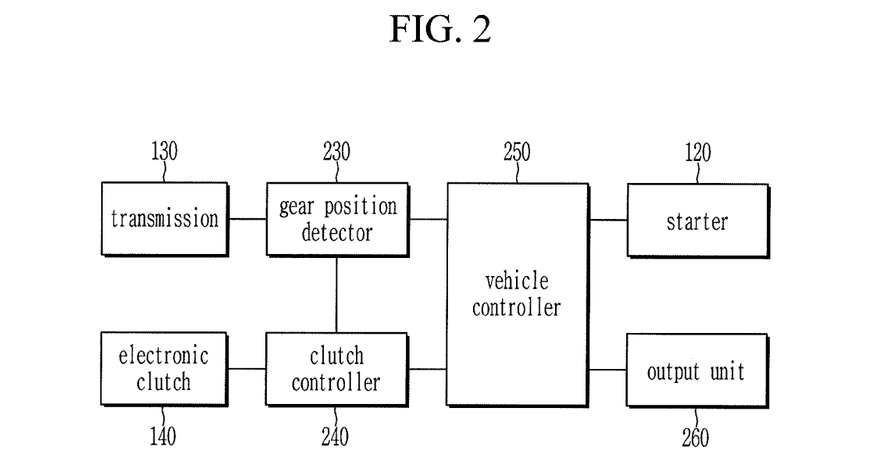
FIG. 2 is a block diagram illustrating an apparatus of controlling engine starting according to an exemplary embodiment of the present invention.

FIG. 2 is a block diagram illustrating an apparatus of controlling engine starting according to an exemplary embodiment of the present invention.

Referring to FIG. 2, the engine start control apparatus of the vehicle includes a gear position detector 230, a clutch controller 240, a vehicle controller 250, and an output unit 260.

The gear position detector 230 detects the position of the gear stage currently engaged with the transmission 130. The gear position detector 230 transmits the detected position of the gear stage to the vehicle controller 250.

Furthermore, the gear position detector 230 provides the detected clutch gear position to the clutch controller 240. In the instant case, the gear position detector 230 may provide the position of the gear stage to the clutch controller 240 through a pulse width modulation (PWM) signal.

The gear position detector 230 provides the gear position data on the detected gear position to the vehicle controller 250. For example, the gear position detector 230 may provide the gear position data to the vehicle controller 250 in a pin-to-pin manner.

The clutch controller 240 controls an electronic clutch 140. That is, the clutch controller 240 controls the pressure of the fluid supplied to the electronic clutch 140 to execute the coupling and release of the electronic clutch 140, control the power of the engine 110.

The clutch controller 240 is connected to the vehicle controller 250 via a vehicle communication network. Here, the vehicle communication network may be a Controller Area Network (CAN), a FlexRay, a Media Oriented Systems Transport (MOST), a Local Interconnect Network (LIN), or the like.

The clutch controller 240 checks the status of the electronic clutch 140 and generates clutch status data. The clutch controller 240 provides clutch status data to the vehicle controller 250 via the vehicle communication network.

The clutch controller 240 receives the position of the gear stage from the gear position detector 230 and generates gear stage data. The clutch controller 240 provides gear stage data to the vehicle controller 250 via the vehicle communication network.

The vehicle controller 250 controls the starter 120 and the output unit 260 based on data provided from the gear position detector 230 and the clutch controller 240 that are components of the engine starting control device.

In other words, the vehicle controller 250 receives a starting signal.

That is, when a driver requests starting through a key or a button, the vehicle controller 250 may receive a starting signal from a starting key or an Smart Key (SMK, not shown).

The vehicle controller 250 checks whether the vehicle communication network and the clutch controller 240 have a failure or not.

When the vehicle communication network and the clutch controller 240 are normal, the vehicle controller 250 receives gear stage data from the clutch controller 240 and the gear position data from the gear position detector 230

The vehicle controller 250 may control the starting of the engine 110 by driving the starter 120 based on the gear stage data and the gear position data.

The vehicle controller 250 may be implemented as at least one microprocessor operating by a predetermined program, and the predetermined program may include instructions for executing a method for controlling starting of an engine for vehicle according to an exemplary embodiment of the present invention.

An operation of such a vehicle controller 250 will be described in further detail with reference to FIG. 3.

The output unit 260 outputs a warning notification data. Such a warning notification data may include information for the driver to move the gear level to the N stage.

The output unit 260 may output the warning notification data to the driver, and the type thereof is irrelevant. For example, the output unit 260 may be a speaker that outputs the warning notification data as a voice or a display unit that can display the warning notification data through letters, numbers, and symbols. Such a display unit may include at least one of a navigation, a cluster, and a communication terminal device of a driver mounted in a vehicle.

On the other hand, it has been described here as an example that only the starter 120 is mounted in the vehicle, but is not limited thereto, and any device configured for starting the engine 110 may be used. For example, the vehicle may further include a mild hybrid starter & generator (MHSG) configured for starting the engine 110 or generating power by the output of the engine 110. When the MHSG is mounted in the present manner, the vehicle controller 250 may start the engine 110 by driving the MHSG as well as the starter 120.

Hereinafter, a method for controlling engine starting is described in detail with reference to FIG. 3 and FIG. 4.

Figure 3:
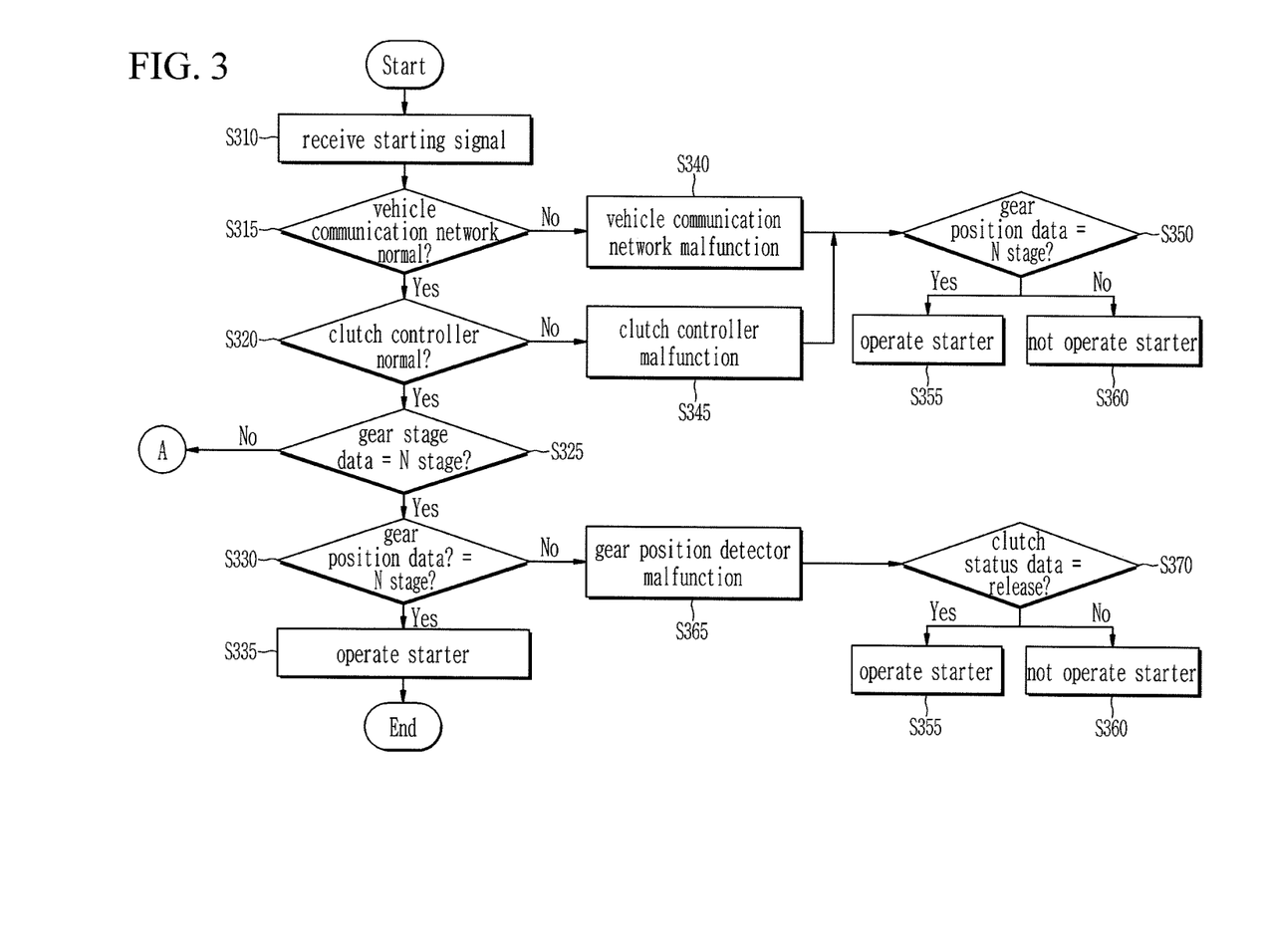
FIG. 3 and FIG. 4 are flowcharts illustrating a method for controlling engine starting according to an exemplary embodiment of the present invention.
Figure 4:
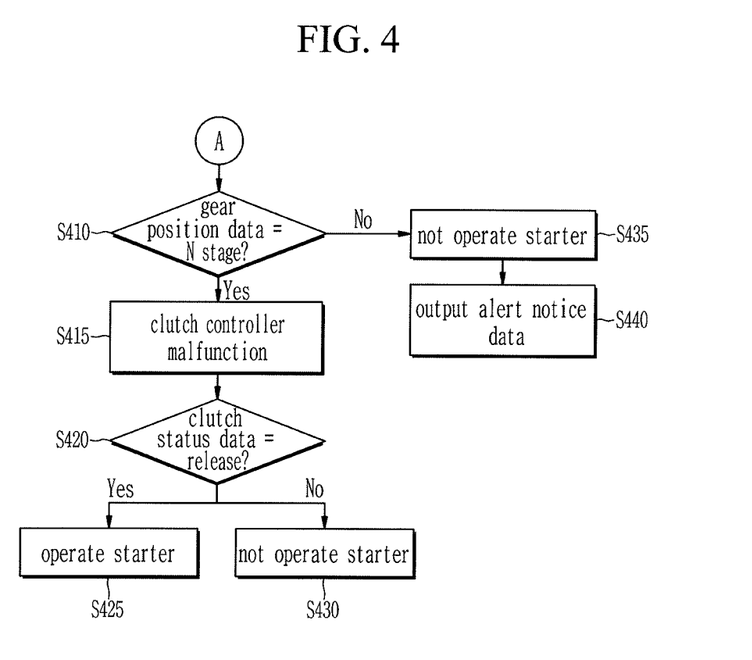

FIG. 3 and FIG. 4 are flowcharts illustrating a method for controlling engine starting according to an exemplary embodiment of the present invention.

Referring to FIG. 3, the vehicle controller 250 receives a starting signal at step S310. In the case of key starting, the vehicle controller 250 receives a starting signal from a starting key or a key box. Here, the vehicle controller 250 may receive a starting signal from the starting key or the key box through pin-to-pin manner.

In the case of button starting, the vehicle controller 250 receives a starting signal from smartkey system (SMK). Here, the vehicle controller 250 may receive a starting signal from the SMK through a vehicle communication network.

The vehicle controller 250 determines whether the vehicle communication network is normal at step S315. That is, the vehicle controller 250 may determine whether the vehicle communication network is normal through a failure inspection method. For example, the failure inspection method may include a checksum or a Cyclic Redundancy Check (CRC).

If the vehicle communication network is normal, the vehicle controller 250 determines whether the clutch controller 240 is normal at step S320. That is, when the vehicle communication network is normal, the vehicle controller 250 may determine whether the clutch control is normal through the failure inspection method.

If the vehicle communication network and the clutch controller 240 are normal, the vehicle controller 250 determines whether the gear stage data includes a state of N stage at step S325. The gear position detector 230 detects the position of the gear stage currently fastened to the transmission 130 and provides the detected gear position to the clutch controller 240. In the instant case, the gear position detector 230 may provide the position of the gear stage to the clutch controller 240 through PWM.

The clutch controller 240 receives the position of the gear stage from the gear position detector 230 and generates gear stage data based on the position of the provided gear stage.

The clutch controller 240 provides the gear stage data to the vehicle controller 250 via the vehicle communication network.

The vehicle controller 250 determines whether the gear stage data provided from the clutch controller 240 is N stage. The reason for determining whether the gear stage of the transmission 130 is the N stage is that the engine 110 may be started when gear stage is N stage, in other words, neutral stage.

When the gear stage data includes a state of N stage, the vehicle controller 250 determines whether the gear position data includes a state of N stage step S330. In other words, the gear position detector 230 provides the detected gear position data to the vehicle controller 250 through a pin-to-pin manner.

The vehicle controller 250 determines whether the gear position data provided from the gear position detector 230 is N stage, which is a neutral stage for starting.

If the gear stage data and the gear position data are N stage, the vehicle controller 250 drives the starter 120 at step S335. That is, when the gear stage data provided from the clutch controller 240 and the gear position data detected by the gear position detector 230 are N stages, the vehicle controller 250 drives the starter 120 to start the engine 110.

Meanwhile, the vehicle controller 250 determines whether the vehicle communication network is normal. When the vehicle communication network is abnormal, the vehicle controller 250 determines the vehicle communication network to be abnormal at S340. In the instant case, the vehicle controller 250 may enter the P-CODE and FAIL-SAFE modes after determining that the vehicle communication network is a failure.

The vehicle controller 250 determines whether the clutch controller 240 is normal. When the clutch controller 240 is abnormal, the vehicle controller 250 determines the clutch controller 240 to be abnormal at step S345. In the instant case, the vehicle controller 250 may determine the clutch controller 240 to be abnormal and then enter the P-CODE and FAIL-SAFE modes.

When the vehicle communication network or the clutch controller 240 is broken, the vehicle controller 250 determines whether the gear position data provided from the gear position detector 230 is N stage at step S350.

When the gear position data includes a state of N stage, the vehicle controller 250 drives the starter 120 (S355). That is, the vehicle controller 250 drives the starter 120 to start the engine 110 when the gear position data provided from the gear position detector 230 is N stage, which indicates the neutral stage.

Accordingly, the vehicle controller 250 may determine the position of the gear stage based on the gear position data provided directly from the gear position detector 230 through the pin-to-pin manner even when a failure occurs in the vehicle communication network or the clutch controller 240. Accordingly, the engine 110 may be started.

On the other hand, the vehicle controller 250 does not drive the starter 120 if the gear position data does not include a state of N stage at step S360.

On the other hand, when the gear position data is not the N stage, the vehicle controller 250 determines the determination on the N stage of the gear position detector 230 to be abnormal at step S365. That is, when the gear stage data includes a state of N stage but the gear position data provided from the gear position detector 230 is not N stage, the vehicle controller 250 may determine the determination on the N stage of the gear position detector 230 to be abnormal. Thereafter, the vehicle controller 250 may enter the P-CODE and FAIL-SAFE modes.

The vehicle controller 250 determines whether the clutch status data is released step S370.

In other words, the vehicle controller 250 receives the clutch status data from the clutch controller 240 after determining that the N-stage determination of the gear position detector 230 is abnormal In the instant case, the vehicle controller 250 may receive the clutch status-/data from the clutch controller 240 through the vehicle communication network.

The vehicle controller 250 determines whether the clutch status data clutch includes a state in which the electronic clutch is released. The reason for determining whether the electronic clutch 140 is released is because the engine starting may be performed when the electronic clutch 140 released.

The vehicle controller 250 drives the starter 120 to start the engine 110 when the clutch status data clutch includes a state in which the electronic clutch is released at step S375.

If the clutch status data is 'coupled', the vehicle controller 250 may not drive the starter 120 at step S380.

Referring to FIG. 4, when the gear stage data is not the N stage, the vehicle controller 250 determines whether the gear position data is 'N stage at step S410. That is, the vehicle controller 250 determines whether the gear position data provided from the gear position detector 230 is N stage to determine whether the gear stage data provided from the clutch controller 240 is an error.

If the gear position data includes a state of N stage, the vehicle controller 250 determines the N-stage determination of the clutch controller 240 to be abnormal at step S415. The vehicle controller 250 may determine the N-stage determination of the clutch controller 240 to be abnormal, and then enter the P-CODE and FAIL-SAFE modes.

The vehicle controller 250 determines whether the clutch status data of the electronic clutch 140 is 'released' at step S420.

When the clutch status data clutch includes a state in which the electronic clutch is released, the vehicle controller 250 drives the starter 120 to start the engine 110 at step S425.

When the clutch status data is 'coupled', the vehicle controller 250 may not drive the starter 120 at step S430.

Meanwhile, if the gear stage data is not the N stage and the gear position data is not the N stage, the vehicle controller 250 may not drive the starter 120 at step S435.

The vehicle controller 250 outputs the warning notification data through the output unit 260 at step S440. That is, the vehicle controller 250 outputs the warning notification data through the output unit 260 through sound or text to inform the driver of moving the gear level to the N stage.

While the present invention has been described in connection with what is presently considered to be practical exemplary embodiments of the present invention, it is to be understood that the present invention is not limited to the included exemplary embodiments. On the other hand, it is directed to cover various modifications and equivalent claims as well as various alternatives and modifications thereof. It is intended that the scope of the present invention be defined by the Claims appended hereto and their equivalents."

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling starting of an engine, the apparatus including:
    a starter configured to start the engine;
    an electronic clutch mounted between the engine and a transmission;
    a gear position detector configured to detect a position of gear stage of the transmission and generate a gear stage position data;
    a clutch controller configured to control the electronic clutch to be coupled or released, receive the gear stage position data from the gear position detector, and generate a gear stage status data; and
    a vehicle controller connected to the clutch controller through a vehicle communication network, and configured to receive start signal, determine when the vehicle communication network and the clutch controller are normal, receive the gear position data from the gear position detector and the gear stage status data from the clutch controller in a response that the vehicle communication network and the clutch controller are determined to be normal, and operate the starter to start the engine based on the gear stage status data and the gear position data.

2. The apparatus of claim 1, wherein the vehicle controller is configured to receive the gear position data from the gear position detector in a pin-to-pin manner.

3. The apparatus of claim 1, wherein the vehicle controller is configured to operate the starter to start the engine when the vehicle communication network and the clutch controller are normal, the gear stage status data includes a state of N stage, and the gear position data includes the state of N stage.

4. The apparatus of claim 1, wherein the vehicle controller is configured to determine a status determination on the clutch controller to be abnormal when the vehicle communication network and the clutch controller are normal, the gear stage status data does not include a state of N stage, the gear position data includes the state of N stage, and operate the starter to start the engine upon determining that a clutch status data of the electronic clutch includes a state in which the electronic clutch is released.

5. The apparatus of claim 1, wherein the vehicle controller is configured to determine a status determination on the gear position detector to be abnormal when the vehicle communication network and the clutch controller are normal, the gear stage status data includes a state of N stage, the gear position data does not include the state of N stage, and operate the starter to start the engine upon determining that a clutch status data of the electronic clutch includes a state in which the electronic clutch is released.

6. The apparatus of claim 1, wherein the vehicle controller is configured to generate an alert notice data upon determining that the vehicle communication network and the clutch controller are normal and the gear stage status data and the gear position data do not include the state of N stage, and output the alert notice data through an output unit.

7. The apparatus of claim 1, wherein the vehicle controller is configured to operate the starter to start the engine when the vehicle communication network or the clutch controller is abnormal and the gear position data includes the state of N stage.

8. A method for controlling starting of an engine of a vehicle including a starter configured to start the engine, an electronic clutch mounted between the engine and a transmission, a gear position detector configured to generate a gear position data by detecting a position of gear stage of the transmission, and a clutch controller configured to control the electronic clutch to be coupled or released, receive the gear stage position data from the gear position detector, and generate a gear stage status data, the method comprising:
    upon determining that a start signal is input to the vehicle, determining, by the vehicle controller, when a vehicle communication network and the clutch controller are normal or abnormal;
    upon determining that the vehicle communication network and the clutch controller are normal, determining, by the vehicle controller, when the gear stage status data received from the clutch controller is a state of N stage;
    upon determining that the gear stage data includes the state of N stage, determining, by the vehicle controller, when the gear position data received from the gear position detector includes the state of N stage; and
    upon determining that the gear position data includes the state of N stage, operating, by the vehicle controller, to start the engine.

9. The method of claim 8, further including:
    after the determining that the vehicle communication network and the clutch controller are normal or abnormal;

upon determining that the vehicle communication network or the clutch controller is abnormal, determining, by the vehicle controller, when the gear position data received from the gear position detector includes the state of N stage; and upon determining that the gear position data includes the state of N stage, operating, by the vehicle controller, to start the engine.

10. The method of claim 8, further including:

after determining that the gear stage status data includes the state of N stage, upon determining that the gear stage data does not include the state of N stage, determining, by the vehicle controller, when the gear position data received from the gear position detector includes the state of N stage;

upon determining that the gear position data includes the state of N stage, determining, by the vehicle controller, a status determination on the clutch controller to be abnormal;

determining, by the vehicle controller, when the clutch status data received from the electronic clutch includes a state in which the electronic clutch is released; and upon determining that the clutch status data clutch includes the state in which the electronic clutch is released, operating, by the vehicle controller, to start the engine.

11. The method of claim 10, further including:

after the determining that the gear position data received from the gear position detector includes the state of N stage when the gear stage data does not include the state of N stage, when the gear position data does not include the state of N stage, generating, by the vehicle controller, an alert notice data; and outputting, by an output unit, the alert notice data.

12. The method of claim 8, further including:

after the determining that the gear position data includes the state of N stage, upon determining that the gear position data does not include the state of N stage, determining, by the vehicle controller, a status determination on the gear position detector to be abnormal;

determining, by the vehicle controller, when the clutch status data received from the electronic clutch includes a state in which the electronic clutch is released; and upon determining that the clutch status data clutch includes the state in which the electronic clutch is released, operating, by the vehicle controller, to start the engine.

* * * * *